US008473742B2

(12) United States Patent
Shuster

(10) Patent No.: US 8,473,742 B2
(45) Date of Patent: *Jun. 25, 2013

(54) METHOD OF DISTRIBUTING A DECRYPTION KEY IN FIXED-CONTENT DATA

(76) Inventor: Gary Stephen Shuster, Fresno, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 13/108,539

(22) Filed: May 16, 2011

(65) Prior Publication Data

US 2011/0283105 A1 Nov. 17, 2011

Related U.S. Application Data

(63) Continuation of application No. 12/059,361, filed on Mar. 31, 2008, now Pat. No. 7,945,052.

(60) Provisional application No. 60/908,738, filed on Mar. 29, 2007.

(51) Int. Cl.
*H04L 9/32* (2006.01)
*H04L 29/06* (2006.01)

(52) U.S. Cl.
USPC .......................... 713/168; 713/150; 713/180

(58) Field of Classification Search
None
See application file for complete search history.

(56) References Cited

U.S. PATENT DOCUMENTS

| | | | |
|---|---|---|---|
| 5,643,086 A | 7/1997 | Alcorn et al. | |
| 5,991,399 A | 11/1999 | Graunke et al. | |
| 6,061,656 A | 5/2000 | Pace | |
| 6,106,396 A | 8/2000 | Alcorn et al. | |
| 6,149,522 A | 11/2000 | Alcorn et al. | |
| 6,374,357 B1 | 4/2002 | Mohammed et al. | |
| 6,438,235 B2 | 8/2002 | Sims, III | |
| 6,565,443 B1 | 5/2003 | Johnson et al. | |
| 6,738,878 B2 | 5/2004 | Ripley et al. | |
| 6,912,634 B2 | 6/2005 | Ripley et al. | |
| 6,948,070 B1 | 9/2005 | Ginter et al. | |
| 6,988,267 B2 | 1/2006 | Harris et al. | |
| 7,069,246 B2 | 6/2006 | Stebbings | |
| 7,502,470 B2 * | 3/2009 | Hanko et al. | 380/200 |
| 7,702,925 B2 * | 4/2010 | Northcutt et al. | 713/193 |
| 8,385,544 B2 * | 2/2013 | Kobayashi | 380/201 |
| 2004/0039911 A1 | 2/2004 | Oka et al. | |
| 2004/0052369 A1 * | 3/2004 | Stebbings | 380/200 |

(Continued)

OTHER PUBLICATIONS

Look-up Table Based Chaotic Encryption of Audio Files; Ganesan, K.; Muthukumar, R.; Murail, K; Circuits and Systems, 2006. APCCAS 2006, IEEE Asia Pacific Conference on; Publication Year 2006, pp. 1951-154.

(Continued)

*Primary Examiner* — David Y Jung
(74) *Attorney, Agent, or Firm* — Novak Druce Connolly Bove + Quigg LLP; Jonathan Jaech

(57) ABSTRACT

Secondary content in encrypted for distribution to client terminals by selecting at least a portion of raw encrypted audio-video data (REAVD) that is provided on a media article as an encryption key, encrypting secondary content using the encryption key, and storing encrypted secondary content at a remotely located host. The media article can then be used for providing access to the encrypted secondary content to client terminals by receiving encrypted secondary content at a client terminal, extracting a decryption key from a media article encoded with REAVD, the decryption key being determined by at least a portion of the REAVD, using the decryption key to decrypt the secondary content, and outputting the decrypted secondary content from the client terminal.

19 Claims, 5 Drawing Sheets

U.S. PATENT DOCUMENTS

2004/0068654 A1    4/2004    Cockerille et al.
2004/0073516 A1    4/2004    Yamamichi et al.
2004/0255139 A1    12/2004    Giobbi
2005/0204019 A1    9/2005    Flynn et al.

OTHER PUBLICATIONS

Random data encryption algorithm (RDEA); Ammar, A.; ElSherbini, A.; Ashour, I.; Shiple, M.; Radio Science Conference, 2005, NRSC 2005, Proceedings of the Twenty-Second National; Publication Year: 2005, pp. 359-366.

Partial Multimedia Encryption with Different Security Levels; Yicong Zhour; Panetta, K.; Aagaian, S.; Technologies for Homeland Security, 2008 IEEE Conference on; Publication Year: 2008, pp. 513-518.

* cited by examiner

METHOD OF DISTRIBUTING A DECRYPTION KEY IN FIXED-CONTENT DATA

CROSS-REFERENCE TO RELATED APPLICATIONS

This application is a continuation of Ser. No. 12/059,361, now U.S. Pat. No. 7,945,052, which claims priority pursuant to 35 U.S.C. §119(e) to U.S. provisional application Ser. No. 60/908,738 filed Mar. 28, 2007, which applications are specifically incorporated herein, in their entirety, by reference.

BACKGROUND

1. Field of the Invention

The present invention relates to management of digital content, and in particular, to systems and methods for providing protected digital content to authorized users.

2. Description of Related Art

Piracy is a significant concern among digital content providers. With the ubiquity of high speed Internet connectivity, transfers and downloads of even high definition quality movies can easily and rapidly be accomplished over networks. Moreover, the electronic delivery of digital content removes several barriers to pirating. One barrier that is removed is any requirement for the user to purchase a tangible article, such as CD and DVD disks, containing the digital content. Another barrier is the digital format of the content itself. Because there is no degradation in quality of copied digital content, there is no perceived disadvantage to using original versus pirated digital content. Copyrighted digital content of all types is regularly pirated on a massive scale, demonstrating the failure of present technology to prevent unauthorized copying.

Digital content providers have responded to the threat of digital piracy by implementing various strategies to discourage or prevent unauthorized access and copying. One such strategy is to provide incentives for consumers to purchase original DVD disks by including value-added content that is not otherwise available to the public. The problem persists, however, in that the original DVD disks themselves can be pirated. To that end, a copy protection requirement, known as the content scrambling system (CSS), is implemented in the DVD standards to prevent unauthorized copying of video files directly from the disc. CSS accomplishes this by scrambling certain sectors containing audio-video data in such a way that the data cannot be used to recreate a valid signal. The scrambled sectors are encrypted with a title key stored in the sector header and a disc key which is hidden in the control area of the disc and is not directly accessible.

The CSS algorithm and keys were supposed to remain secret, but in 2000, computer hackers were able to reverse engineer the algorithm and derive all of the keys. Still, CSS and other content-protection schemes for DVD, Blu-Ray, and other digital media often prevent the average user from using a computer to copy a DVD movie or other digital content, and perfect unauthorized DVD copies are rare or non-existent. Instead, many pirated copies of DVD's are generated using what is sometimes referred to as the "analog hole" to create digital copies from the analog output of a player device. Even digital pirated copies can often be detected by small differences in digital data that may or may not affect the copies' playability and analog output. Absolute content protection is perhaps unrealistic, as a completely foolproof copy protection method would make it impossible to use the disc. If you can see it or hear it, you can copy it. There is therefore a need for digital content providers to be able to provide a more secure distribution system for digital content that protects the rights of content owners by further encouraging customers to purchase original authorized copies of content and provides greater copyright protection for downloadable content.

SUMMARY

Various systems and methods are disclosed herein for encouraging the purchase of authorized copies of original content by including bonus secondary content and also for providing a more secure distribution system for the bonus secondary content. This may be accomplished by selecting a decryption key that is determined by at least a portion of the raw encrypted audio-video data ("REAVD") that is provided on an original media article, such as an optical DVD disc, Blu-Ray disc, CD-ROM or a memory device. As used herein, "REAVD" may include incidental bits that are not used directly to create audio-video output or that are not encrypted, for example, a sector header or decryption key integrated with encrypted audio-video data. Conversely, as used herein, "REAVD" excludes data that is not primarily comprised of bits that are used to generate an audio-video output signal when played by a compatible media player device. The REAVD may be itself encrypted using a key that is not the decryption key. As used herein, "audio-video" refers to data or a signal for producing sounds and images recognizable by a human being as images of a real or imaginary scene, and excludes merely random, chaotic or machine-only recognizable sounds and images. The decryption key may be extracted from different data segments on the media article and may be used at a client terminal to decrypt encrypted secondary content. Different data reconstruction protocols may be provided to extract the decryption key for the same media article.

A portion or all of the REAVD that is used to determine the decryption key may read from a segment of the media article that cannot be copied to a writable media article copy using a consumer CD/DVD burner or other consumer copying device. For example, discs manufactured according to the DVD standard can include encoded data on a physical portion of the disc that cannot be written to a copy made using a consumer DVD burner. A molded disc, in other words, can be made that holds more data than can be burned onto a writable disc. Thus, the method may be configured to ensure that only those who possess original authorized copies of the DVD disc are able to decrypt the encrypted secondary content. It is understood that the methods and systems disclosed herein are not limited to a particular hardware or software architecture for carrying out the steps described herein.

In one embodiment, a method for using a media article for providing access to encrypted secondary content at a client terminal is provided. The method comprises receiving encrypted secondary content at a client terminal; extracting a decryption key from a media article encoded with raw encrypted audio-video data ("REAVD"), the decryption key being determined by at least a portion of the REAVD; using the decryption key to decrypt the encrypted secondary content; and outputting the decrypted secondary content from the client terminal.

In accordance with one aspect of the technology, the client terminal may receive the encrypted secondary content from a remote host, a second media article, or both.

In accordance with another aspect of the technology, the decryption key may be determined by different portions of encoded REAVD located on different segments of the media article. The decryption key may also be further determined by one or more REAVD data segments which are unwritable using a copying device, one or more data segments which relate to the encryption status of the media article, or both.

In accordance with yet another aspect of the technology, the decryption key may be determined by the entirety of the data on the media article with a one-to-one mapping of the encrypted secondary content and the data on the media article, or any combination of the foregoing. The one-to-one mapping may be, for example, an exclusive "OR" operation with the encrypted secondary content to produce decrypted secondary content, or the addition/subtraction of the DVD REAVD data in segregated bits, bytes, or other bit groups from the digital data of the encrypted secondary content to produce decrypted secondary content.

In accordance with a further aspect of the technology, outputting the decrypted secondary content from the client terminal may include downloading the secondary content on a memory associated with the client terminal, displaying the secondary content on a display associated with the client terminal, or both.

In another embodiment, a method for encrypting secondary content for distribution to client terminals may be provided. The method comprises selecting at least a portion of REAVD that is provided on a media article as an encryption key; encrypting secondary content using the encryption key; and storing encrypted secondary content at a remotely located host.

In accordance with one aspect of the technology, the method may further comprise any one or more of the following: receiving a request from a client terminal for secondary content and delivering encrypted secondary content to the client terminal. The encrypted secondary content may be decrypted by the client terminal using a decryption key determined by at least a portion of the REAVD provided on the media article that is read by the client terminal. The decryption key may further include one or more data segments which are unwritable using a copying device.

In accordance with another aspect, the encryption key and the decryption key may be identical or different.

Other objects, features and advantages of the present invention will become apparent to those skilled in the art from the following detailed description.

BRIEF DESCRIPTION OF THE DRAWINGS

Like numerals refer to like parts throughout the several views of the drawings.

DETAILED DESCRIPTION

Exemplary methods and systems for selecting and distributing a decryption key used to decrypt secondary content are disclosed herein. In the detailed description that follows, like element numerals are used to denote like elements that appear in the figures.

Figure 1:
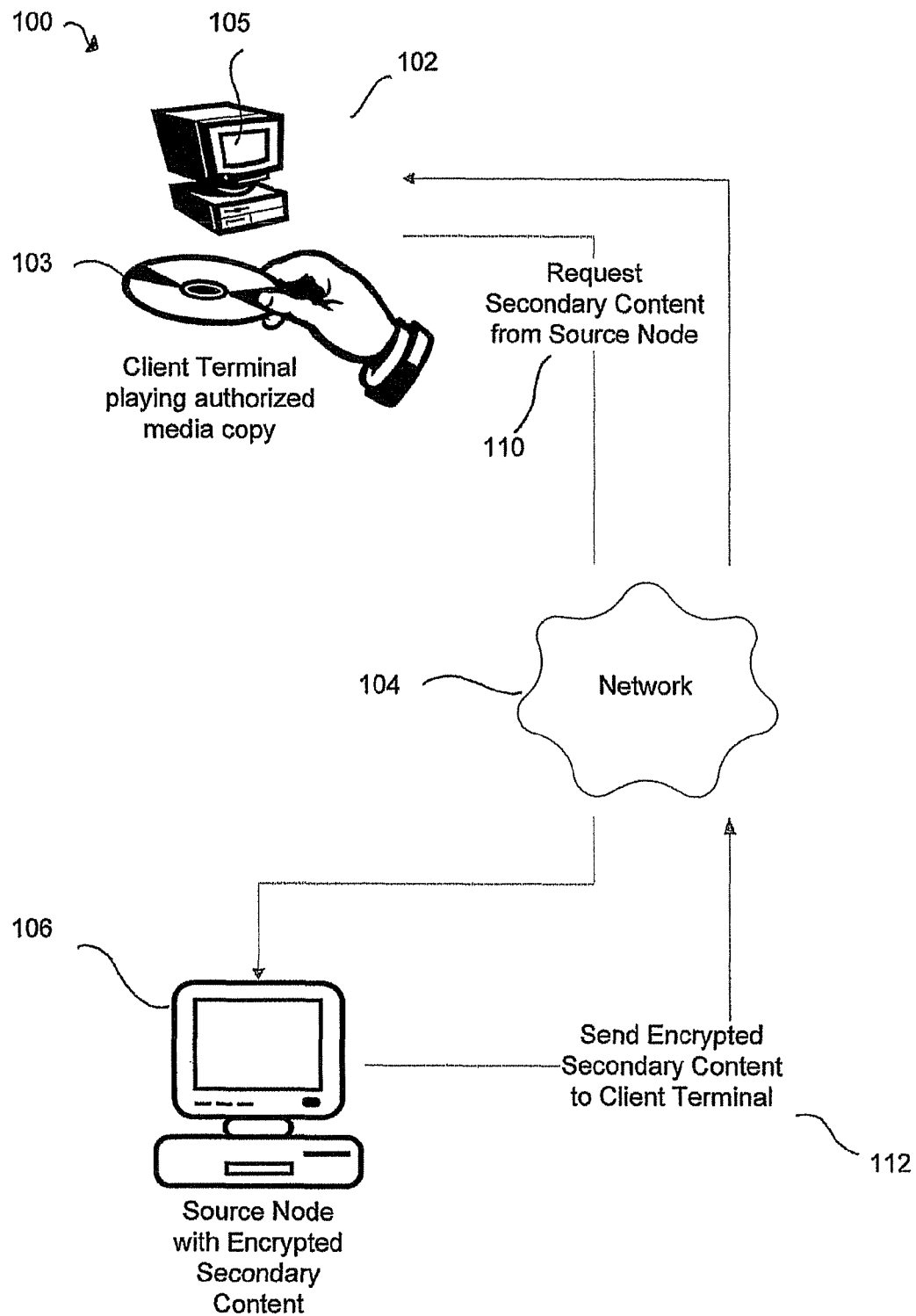
FIG. 1 is a schematic diagram showing the interaction between the client terminal and the source node, and the resulting transmission of encrypted secondary content to the client terminal.

FIG. 1 is a schematic diagram showing a system 100 embodying an exemplary aspect of the disclosed technology. A client terminal 102 plays an original or an authorized copy of a media disc, tape, device or other tangible media article 103 containing raw encrypted audio-video data REAVD, such as, for example, a television episode or motion picture. Media article 103 may be configured such that the REAVD encoded on it generates audio-video output, for example, the television episode or motion picture, when the media article is played in a suitable player. As used herein, a "media article" refers to an individual object or electronic storage device on which digital audio-video data is stored. Client terminal 102 may comprise a general-purpose computer, specialized media player (e.g., DVD, Blu-Ray, or other player), portable media player, cellular telephone with broadband media capability, or any other client that is capable of reading the media article 103 and communicating with a source node 106 for secondary content. Suitable media article 103 may comprise, for example, an imprinted DVD, HD-DVD, or Blu-Ray disc. An imprinted media article 103 may advantageously include data that cannot be written to a disk copy using a consumer media burner, preferably because of inherent limitations of writable media discs. Thus, to the extent that media 103 comprises a perfect copy of an authorized released media article, it may be assumed with a high degree of certainty that the copy is authorized and not pirated. On the other hand, to the extent that media 103 does not comprise a perfect copy of an authorized released media article, it likely will not be useful for decrypting secondary content.

The client terminal 102 may request additional or bonus secondary content 110 residing at a source node 106 over a wide area network 104. The additional secondary content 110 is different and distinct from content encoded on or in the tangible media article 103. The additional content 110 is not encoded on the media article 103. The source node 106 may respond by sending an encrypted copy of the secondary content 112 to the client terminal 102, where the encrypted secondary content may be decrypted based on at least a portion of the REAVD residing on the DVD disc. After being decrypted, an audio-video output may be provided from the decrypted secondary content, using an output device of the client terminal 102, such as display screen 105. In the alternative, terminal 102 may store the decrypted secondary content for future use, or transmit the decrypted secondary content to another device.

In accordance with this embodiment, for example, a user may purchase a DVD disc containing selected episodes of a television series. The REAVD contained in the DVD disc for the television episodes may be used to provide the decryption key for secondary content which may be, for example, a new episode of the current season that is being broadcast and not yet available on any DVD or other media disc. The user may insert the DVD disc into a client terminal to play it. One of the user options provided during play of the DVD disc may include an option to view or download additional content from an online source. By selecting such an option, the user may cause the client computer to download or stream the encrypted new episode, the secondary content, from the source node through the Internet. Since the new episode would be encrypted against the decryption key on the DVD disc for season one, only those who have an authorized or perfect copy of that DVD disc would be able to decrypt and view the new episode.

Figure 2:
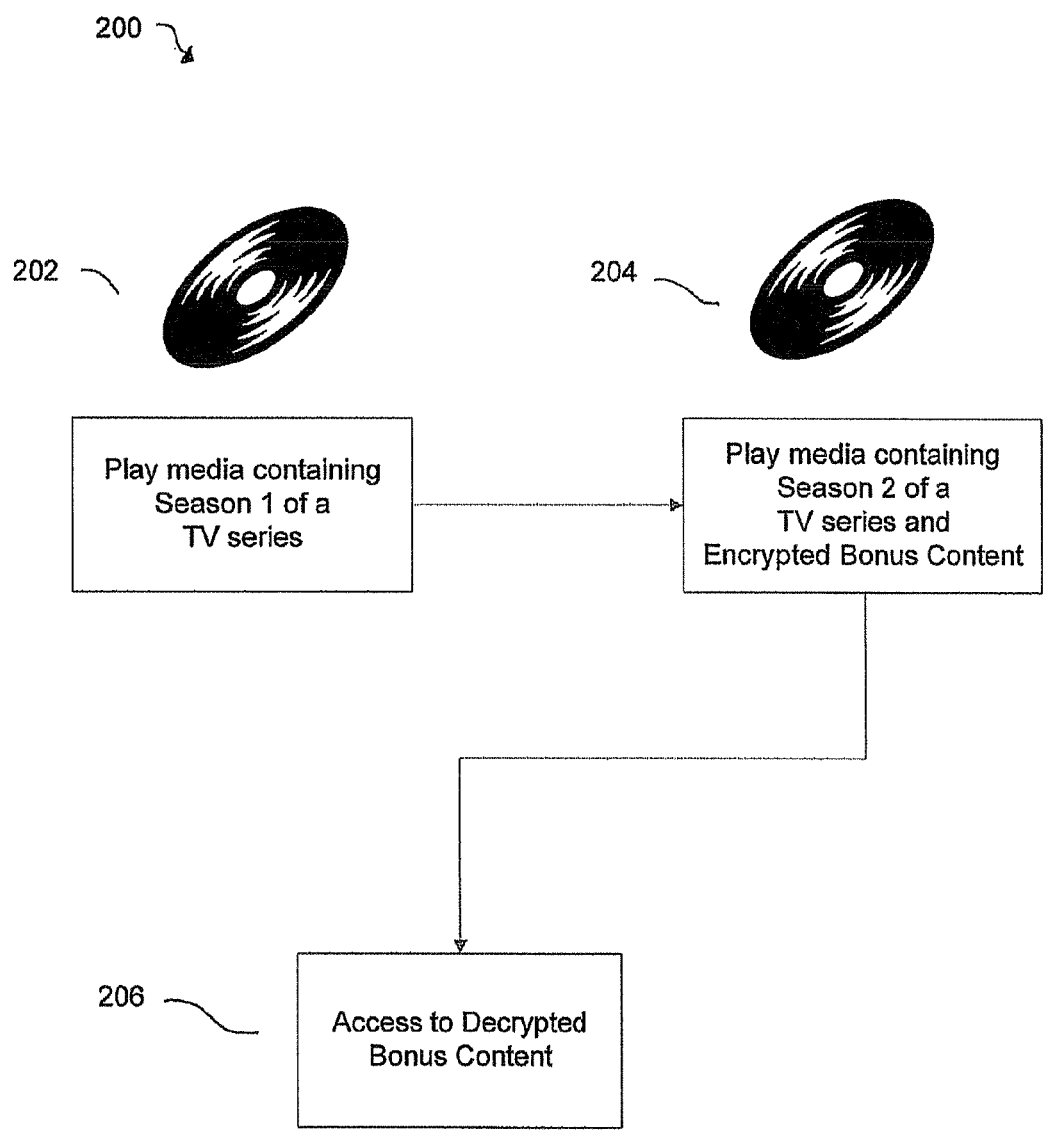
FIG. 2 is a schematic diagram showing the use of two media discs to provide access to encrypted secondary content residing on one of the media discs.

FIG. 2 is a schematic diagram showing another embodiment of the system 200. In accordance with this embodiment, two or more media discs or other media articles 202, 204 may be used to provide access to encrypted bonus content 206 residing on or more of the media discs. The decryption key for the encrypted bonus content would be determined based on the REAVD on two or more media discs, and this decryption key may be used to provide the user access to otherwise hidden or inaccessible secondary or bonus content either from one of the media discs or alternatively, from a remotely located source node.

Figure 3:
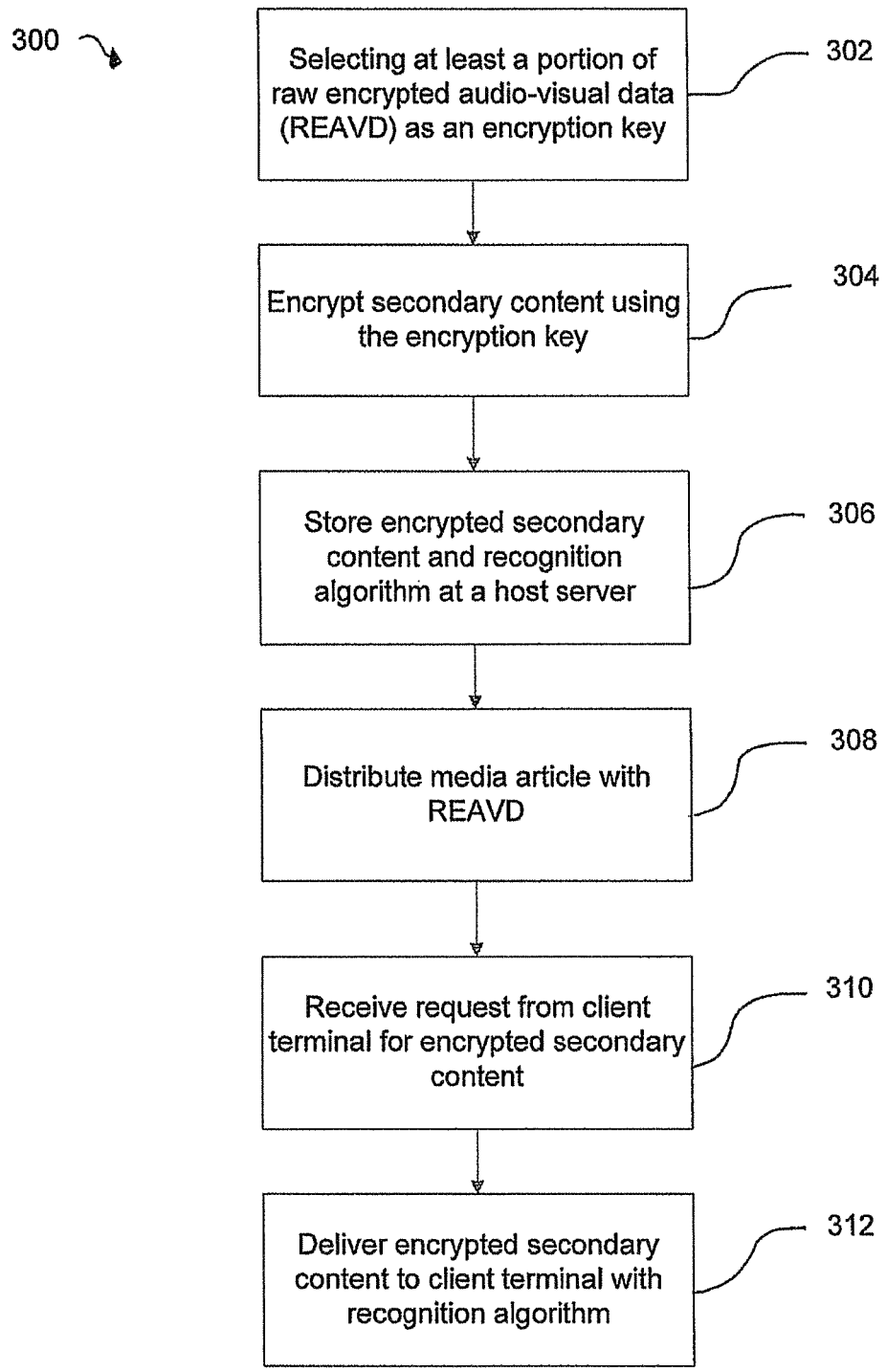
FIG. 3 is a flow chart showing the steps performed by a source node in encrypting secondary content.

FIG. 3 is a flow chart 300 showing exemplary steps that may be performed by a source node in encrypting secondary content for subsequent distribution to authorized client terminals. A media disc, such as a DVD or Blu-Ray disc, may contain REAVD as well as various keys hidden in areas of the disc which are not writable using a consumer media-writing device, for example, a DVD ROM drive or other media writing device. Such areas may include the sector header, the control area of the disc in the lead-in, which cannot be copied using a consumer copying device. Preferably, the media disc is in a "write once, read many format" that cannot readily be erased and rewritten.

One of the first steps may be to select or otherwise define at least a portion of the REAVD encoded on or in the digital media article as an encryption key 302 for secondary content to be released to holders of authorized copies of the media article. The selected REAVD may includes various keys relating to the encryption status of the disc and to also to those hidden in the uncopyable areas of the disc. The selected REAVD may include all of the REAVD encoded on the media article, or some substantial portion of it that is not readily copied. Thus, even if someone duplicated the disc, any change in the encryption status of the underlying disc (e.g., a decrypted copy or analog-to-digital copy) would change the value of the encoded data such that it would become impossible to recover the REAVD used as an encryption key, thereby preventing the proper decryption key from being extracted from the tangible media article. Even a raw data copy of the DVD disc should still be unusable as a decryption key, so long as portions of the data making up the selected REAVD encryption key reside on a portion of a disc cannot be copied by the relevent consumer DVD/CD, Blu-Ray, or other media burners.

The REAVD encryption key may be defined or selected so as to be relatively massive relative to the secondary content to be encrypted/decrypted using the key. "Relatively massive" as used herein means at least 1000 times larger than conventional 128 bit or 256 bit keys (i.e., no less than 128,000 bits). More preferably, however, the REAVD encryption key is of a relatively massive size (i.e., number of bits) comparable to the number of bits in the secondary content to be encrypted using the REAVD key. For example, if the secondary content is exactly 300 megabytes ($2.4 \times 10^9$ bits) in size, the selected REAVD key may also be 300 megabytes in size, depending on the selected encryption/decryption method. Certain one-to-one reversible transforms, for example, an exclusive "OR" operation, are readily used with an key that is exactly the same size as the encrypted secondary data. Other transforms may easily be adopted that operate with other than a 1:1 mapping, such as a 2:1 transform, 1:2 transform, or any other transform requiring a relatively massive key. The present technology is not limited to a particular transform ratio or transform method.

Figure 4A:
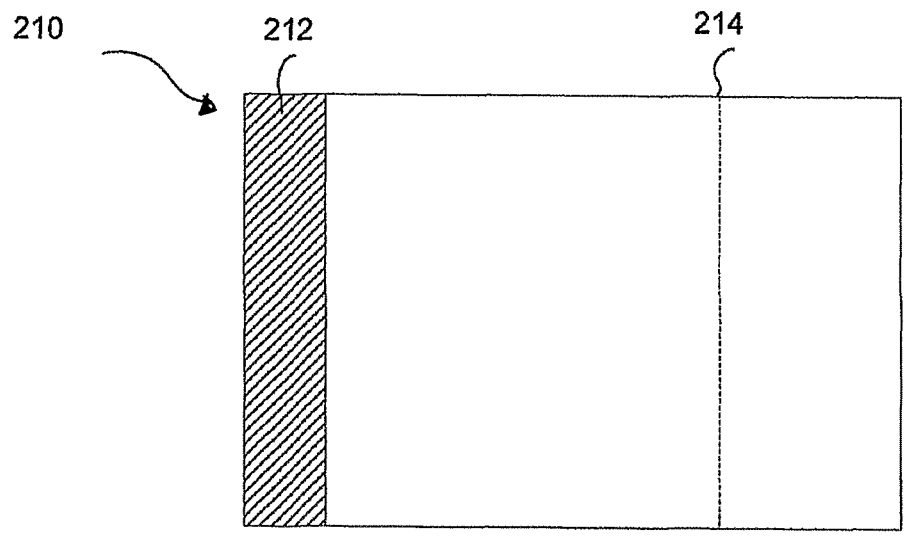
FIGS. 4A-4B are block diagrams illustrating selection of a REAVD encryption key from data encoded on a media article.

FIG. 4A is a block diagram illustrating an algorithm for selection of a REAVD encryption key from a playable media article such as a molded DVD or Blu-Ray disc used to generate audio-video output. The area inside the rectangle 210 represents all of the data encoded on the disc, for example, 600 megabytes of encrypted audio-video data. Area 212 represents data encoded on a sector of the media article that cannot be copied to a writable media disc. Presuming, for the sake of example, that the media article is scanned (read) vertically from left to right, dotted line 214 represents a scan line just after 300 megabytes have been read, starting with the first bit of the uncopyable sector 212. FIG. 4A therefore represents selecting the first "X" bits encoded on the media article to be the REAVD key, where "X" is the number of key bits needed, whether that be equal to the number of bits of secondary content to be encrypted or some other ratio.

Figure 4B:
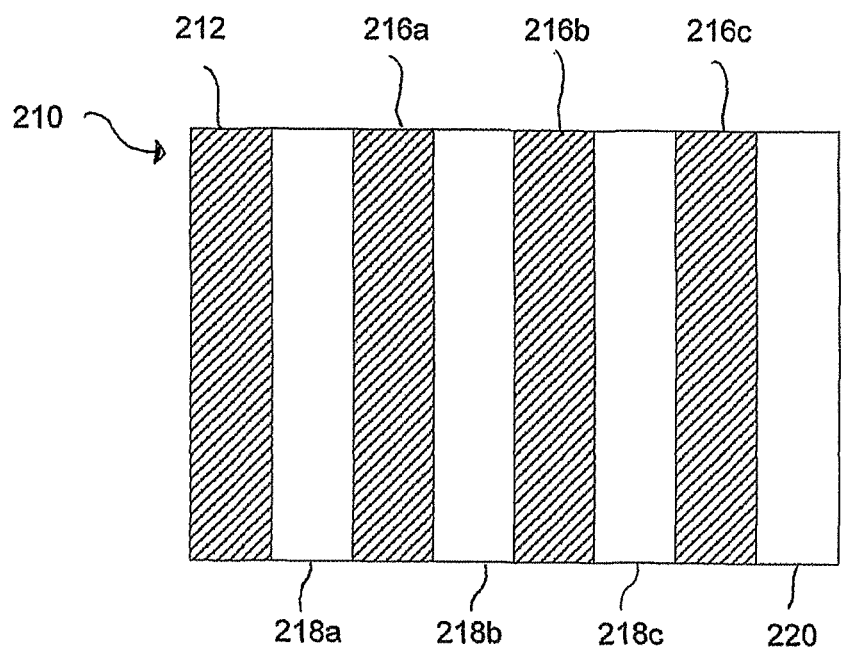

FIG. 4B is a block diagram illustrating an alternative algorithm for selection of a REAVD encryption key from a playable media article. Here, the REAVD may be selected to include, for example, all or a portion of the data in sector 212 and selected blocks of data 216a, 216b, 216c alternating with and spaced apart by unselected blocks of data 218a, 218b and 218c. Block 220 represents a residual unselected portion. Any non-zero number of selected or unselected blocks may be used, in any pattern, including overlapping patterns; FIG. 4A illustrates the simple case of one (1) block while FIG. 4B illustrates multiple blocks. In an overlapping pattern of selected blocks, an "overlapping" portion of the data 210 encoded on the media article is duplicated at a one or more different locations of the REAVD key. In a non-overlapping pattern, none of the data 210 appears more than once in the REAVD key. The multiple blocks may be spaced apart by any non-zero number of bits and may comprise any non-zero number of bits. Using various different selection algorithms, it should be possible to generate a virtually unlimited number of different REAVD encryption keys from any typical large media article, such as a DVD disc or Blu-Ray disc. In addition, by using an overlapping REAVD selection algorithm, it is possible to generate a REAVD encryption key that is any desired degree greater in size than the entire original REAVD data on a given media disk.

The scheme or method of selecting the REAVD key from data encoded on the media article for encrypting at the source, whatever it is, must be provided or known to client devices that have access to an authorized copy of the media article and wish to decrypt secondary content. Therefore, the source device should make a record of the scheme used, herein referred to as a "REAVD key recognition algorithm". The REAVD key recognition algorithm may be varied depending on the release or version of the authorized media article, with time, geographic location, or any other parameter that may be applicable to a plurality of clients or media articles. In the alternative, the REAVD key recognition algorithm may be constant. However, use of a variable REAVD key recognition algorithm may provide greater security. In embodiments where a variable REAVD key recognition algorithm is used, it may be provided to clients when the client seeks to access secondary encrypted content, or at any appropriate prior time. In the alternative, or in addition, the REAVD key recognition algorithm used with a particular release of a media article, or any portion of it, may be predetermined and encoded on the media article itself.

Referring again to FIG. 3, once the REAVD encryption key is selected, it may be stored as an encryption/decryption key for the secondary content for use by the source node. In the alternative, it may be used "on the fly" to encrypt the secondary content and then discarded, provided that the REAVD key recognition algorithm is saved in association with a unique identifier for the media articles containing original REAVD data to which the REAVD key recognition algorithm pertains.

The secondary content may be encrypted using the encryption key 304 and stored at a host server 306 for distribution to authorized client terminals. Various suitable two-way encryption algorithms may be employed at the source using the REAVD encryption key. Performing an exclusive "OR" operation on the data to be encrypted and a REAVD key of equal length is one computational simple example of a reversible encryption transform algorithm, having the advantage of being very fast and assuredly reversible. A myriad of other transforms that exploit and require the use of a relatively massive binary key may also be used. For example, bits from the REAVD key may be inserted at defined intervals (e.g., every other bit, every third bit, etc.) in the secondary content to be encrypted. For further example, the REAVD key or defined portions of it may be added, subtracted, multiplied, divided, raised to a power of, or otherwise used in a reversible transform on the secondary data to be encrypted. Any combination of different transform operations may be used in a given algorithm. As a massive key, the REAVD encryption key may be best suited for symmetric or reversible encryption methods. That is, the same key may be used to both encrypt and decrypt the target data. Hence, the massive REAVD encryption key may be variously referred to herein as an encryption key, encryption/decryption key, or decryption key. Likewise the symmetric encryption algorithm may be variously referred to herein as an encryption algorithm, encryption/decryption algorithm, or decryption algorithm.

In the alternative to symmetric encryption, to the extent that any asymmetric encryption and decryption method is known that can make efficient use of a massive decryption key constituted of predetermined REAVD, such a method may be used to encrypt the secondary content. In such case, the massive REAVD key encoded on the media article should constitute the decryption key of the asymmetric keyset. However, the predetermined, essentially arbitrary nature of the REAVD encoded on the media article, which by definition must include encrypted audio-video data, may prevent or limit its usefulness as a decryption key of an asymmetric keyset. Known asymmetric encryption methods generate a specific public decryption key in a determinate fashion from a known private key. Such a determinate decryption key will not qualify as REAVD no matter what its size, because it cannot, using known technology, be itself decrypted and used to generate audio-video output.

Different encryption transform algorithms may be used for different REAVD data, or in the alternative, an unvarying encryption transform algorithm may be used for all REAVD data encoded on different releases of media articles. The use of different encryption transform algorithms may provide additional security for the encrypted data. The particular encryption algorithm used for a particular release of a media article may be stored by the source server for later use by a client. In the alternative or in addition, all or a portion of the encryption algorithm may be predetermined and encoded on the media article itself.

At any time before or after the secondary content is encrypted and/or stored at the source terminal, the media articles encoded with the REAVD used to encrypt the secondary content may be distributed to end users 308. This may be accomplished using any suitable wholesale/retail distribution method. Such media articles may be promoted as containing keys needed to unlock specified secondary content. Consumers that purchase or otherwise receive the media articles will tend to play the media articles to view the primary content encoded in the REAVD thereon. The primary content may include a program for communicating with a source terminal for the secondary content. In the alternative, or in addition, the media article may be read by a general purpose computer client having a separate program for communicating with a source terminal for the secondary content. Thus, the source terminal may receive requests 310 from one or more clients requesting access to encrypted secondary content associated the various media articles containing a REAVD encryption key.

As discussed in reference to FIG. 1, only client terminals with access to the original or authorized copies of the DVD disc or other media article containing the REAVD decryption key are capable of decrypting the encrypted secondary content. Thus, once a client terminal is playing the original or authorized copies of the DVD disc or other media article, it may also request additional secondary content from the host server. In response to receipt of the request by the source server 310, the encrypted secondary content may be delivered to the client terminal 312. In the alternative, or in addition, the source terminal may determine a REAVD key recognition algorithm associated with the media article at the client terminal, and transmit the REAVD key recognition algorithm to the client in response to the request. This may not be necessary if, in the alternative, the REAVD key recognition algorithm is encoded on the media article or predetermined and known to the client terminal by an earlier communication, such as in a media player update. Likewise, the source terminal may determine an encryption algorithm associated with the media article at the client terminal, and transmit the encryption algorithm to the client in response to the request. Again, this may not be necessary if, in the alternative, the encryption algorithm is encoded on the media article or predetermined and known to the client terminal by an earlier communication. Of course, instead of transmitting the encryption algorithm or the REAVD key recognition algorithm to the requesting client, access may be provided in another suitable way in response to the request, such as, for example, informing the client how to otherwise obtain the requested information or providing a decryption key for it.

Figure 5:
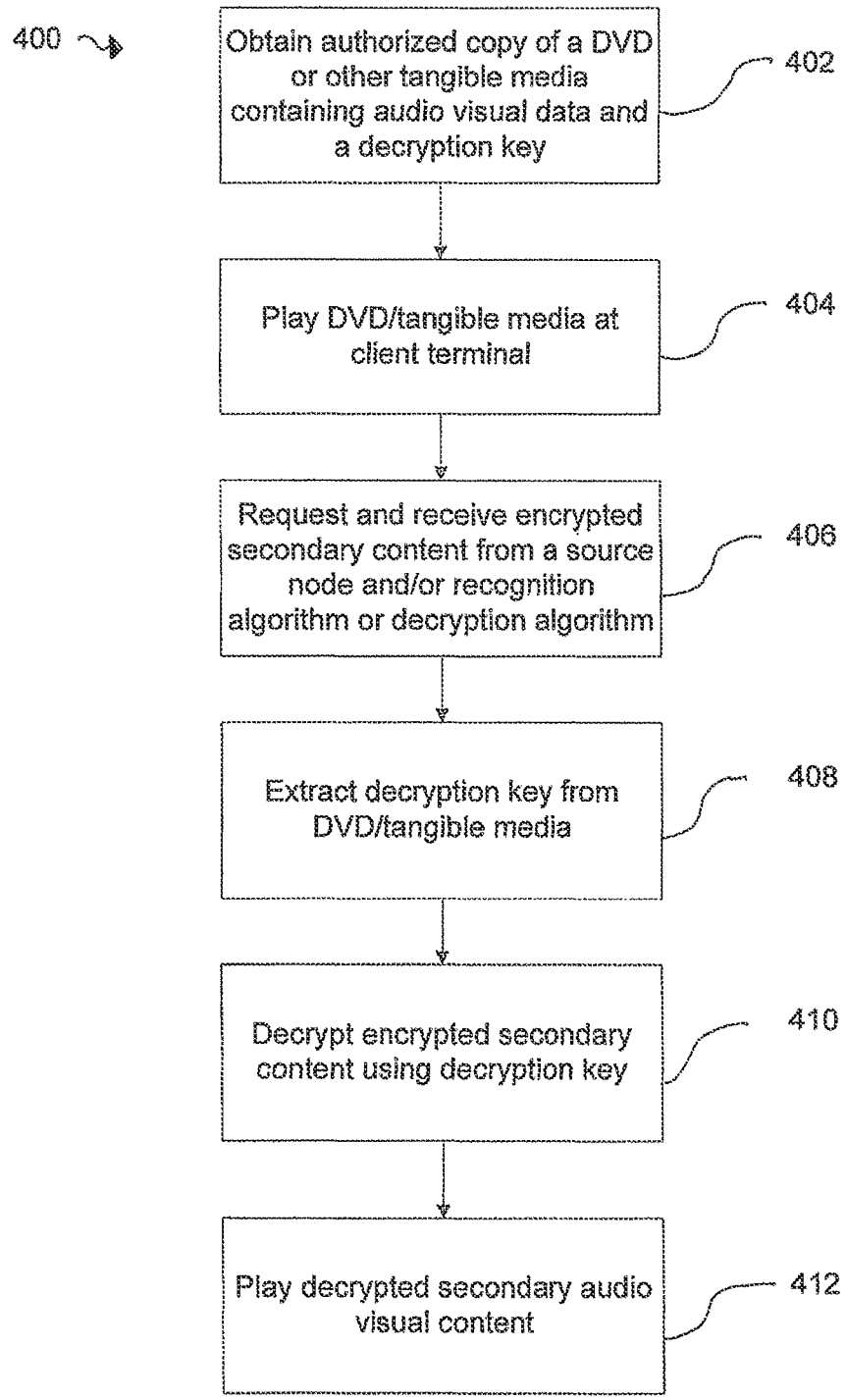
FIG. 5 is a flow chart showing the steps of performed by a client terminal in obtaining access to encrypted secondary content from the source node.

It may not be necessary to transmit the encrypted secondary content from the source terminal to the client. Secondary content may be provided from any other location, including from another portion of the media article, a related media article, or from another server. To proved access to such otherwise located secondary content, the source server may, in response to the client request for access, provide one or both of the REAVD key recognition algorithm or the encryption algorithm, as discussed above. In cooperation with the source terminal, a client terminal having access to the media article with the necessary REAVD key accesses the encrypted secondary content and outputs an audio-visual presentation of the secondary content. FIG. 5 shows exemplary steps of a method 400 performed by a client terminal in obtaining access to encrypted secondary content from the source node. First, the user obtains an original or an authorized copy of a DVD or other media article encoded with REAVD, with the decryption key being determined by at least a portion of the REAVD 402. For example, the user may see the DVD promoted on an on-line store as "providing exclusive access to" additional content of interest, and therefore purchases the DVD. The user places the DVD or other media article in a suitable client terminal, for example, a media center computer or network-enabled playing device. The client terminal then plays the DVD/media article 404 to view the primary content encoded thereon. The primary content may include a menu providing the user with an option to obtain the exclusive additional content. In the alternative, this menu option is provided by a separate application operating on the client terminal and configured to operate in response to insertion on the media article in a player device or port of the client terminal. In response to user selection of such a menu option, or automatically at any designated point during play of the primary program, the client terminal may request and receive access to additional secondary content from a source node 406. This access may be provided in the various ways described above, including but not limited to various combinations of downloading the encrypted secondary content, obtaining a REAVD key recognition algorithm applicable to the media article accessed by the client terminal, or obtaining the correct encryption/decryption algorithm for the secondary content. Using the REAVD key recognition algorithm, the client terminal may extract the massive REAVD decryption key from the DVD/media article 408. The REAVD key recognition algorithm may require accessing data on a portion of the media article that is not normally accessed by the client terminal to play the primary content or to copy the data on the media article to a different media article. As such, unless the client terminal is equipped with specially-designed pirating software and hardware, it should be unable to copy the entire REAVD encryption/decryption key to a different media article.

After the REAVD decryption key is extracted, or concurrently as it is extracted, the client terminal may use the REAVD decryption key to decrypt secondary content 410 provided by the source node or from any other source, including but not limited another media playing device in communication with the client terminal. The secondary content may be decrypted in a continuous process synchronous with the output of the resulting audio-video signal, in an asynchronous batch process, or in some combination of the foregoing, depending on the application. For most content, a continuous synchronous process that does not require storage of the resulting decrypted content may be more secure and more efficiently use client system resources. The client terminal may then play the decrypted secondary content 412 to produce an audio-video output for the user. Method 400 may be repeated to access any additional secondary content for which a particular media article, via its encoded REAVD, provides exclusive access. Such additional content may readily be created and made available at any time after the REAVD is defined.

Thus, it is possible, for example, to use a particular media article, such as a DVD disc of the first episodes of a television series, as a key for unlocking any number of subsequent episodes, or for that matter, an entire library of encrypted information. It is not necessary that the secondary content be related to the primary content encoded in the REAVD media article. It may be desirable, for some applications, for the secondary content to be unrelated. For example, a DVD disk containing "Lectures On The Theory Of Relativity" might be utilized as a key for accessing adults-only entertainment content, whether on-line or encoded on other media articles, effectively preventing inadvertent access to the adults-only content by underage viewers.

In view of the foregoing, various advantages of and applications for the present technology should be apparent. The nature of the technology provides various advantages, some of which may be summarized as follows:

(1) The relatively massive size of the REAVD decryption key, which may be hundreds megabytes or as large as a digital data required for a full-length motion picture, may make widespread distribution of an illegally copied key much more cumbersome than traditional decryption keys.

(2) The use of REAVD that functions for providing a primary program also as an encryption key for secondary content is an efficient use of media and can be used to promote sales of the media articles for the primary program.

(3) The use of a secret REAVD key recognition algorithm, which can readily be changed without any need to change the REAVD on the media article, provides additional security and flexibility.

(4) The use of a secret encryption/decryption algorithm, which can also be readily changed without requiring changes to the REAVD or the REAVD key recognition algorithm, provides yet another layer of additional security and flexibility.

(5) Storage of a portion of the REAVD decryption key on a portion of a media article that is manufactured to not be readily copied to a writable media article copy further enhances security of the key.

The foregoing detailed description and specific examples, while indicating a preferred embodiment of the novel technology disclosed herein, are given by way of illustration and not limitation. Many changes and modifications within the scope of the present invention may be made without departing from the spirit thereof, and the invention includes all such modifications. For example, while the use of DVD discs as media articles has been referred to, it should be appreciated that other data storage formats may be equally suitable for use with the present technology.

What is claimed is:

1. A computer-implemented method for using a media article for providing access to encrypted secondary content to a client terminal, the method comprising:
    receiving encrypted secondary content at a client terminal;
    extracting a decryption key from a media article encoded with raw encrypted audio-video data ("REAVD") primarily comprised of data operable to provide an audio-video output signal when played by a compatible media player device, the decryption key being determined by at least a portion of the REAVD encoding audio-video data;
    decrypting the encrypted secondary content using the decryption key according to a defined decryption algorithm, wherein the REAVD excludes the secondary content and the decryption algorithm is configured for one-to-one mapping between the encrypted secondary content and the at least a portion of the REAVD; and
    outputting the decrypted secondary content from the client terminal.

2. The method of claim 1, wherein the client terminal receives the encrypted secondary content from a remote host.

3. The method of claim 1, wherein the client terminal receives the encrypted secondary content from a second media article distinct from the media article encoded with the REAVD.

4. The method of claim 1, wherein the decryption key is determined by REAVD on different segments of the media article.

5. The method of claim 1, wherein the decryption key is further determined by one or more data segments of the media article that cannot be copied to a writable media article using a copying device because the data segments are encoded in a copy-protected location of the media article.

6. The method of claim 1, wherein the decryption key is further determined by a defined REAVD key recognition algorithm.

7. The method of claim 1, wherein the one-to-one mapping comprises an exclusive "OR" operation.

8. The method of claim 1, wherein extracting the decryption key comprises extracting the decryption key being of a relatively massive size.

9. The method of claim 8, wherein extracting the decryption key comprises extracting the decryption key being equal in size to the secondary content.

10. A computer-implemented method for encrypting secondary content for distribution to client terminals, the method comprising:

selecting at least a portion of raw encrypted audio-video data ("REAVD") that is provided on a media article encoding audio-video data to define an encryption key, wherein the REAVD is primarily comprised of data operable to provide an audio-video output signal when played by a compatible media player device;

encrypting secondary content using the encryption key according to a defined encryption algorithm thereby producing encrypted secondary content, wherein the secondary content excludes the REAVD and the encryption algorithm is configured for one-to-one mapping between the encrypted secondary content and the at least a portion of the REAVD; and storing the encrypted secondary content at a remotely located host.

11. The method of claim 10, further comprising receiving a request from a client terminal for the encrypted secondary content.

12. The method of claim 11, further comprising transmitting the encrypted secondary content in response to a request from the client terminal.

13. The method of claim 10, further comprising selecting the at least a portion of REAVD using a defined REAVD key recognition algorithm for the media article.

14. The method of claim 13, further comprising transmitting the defined REAVD key recognition algorithm in response to a request from a client terminal.

15. The method of claim 10, further comprising encrypting the secondary content using a defined symmetric encryption algorithm for the media article.

16. The method of claim 15, further comprising transmitting the defined symmetric encryption algorithm in response to a request from a client terminal.

17. The method of claim 13, further comprising selecting the at least a portion of REAVD including one or more data segments located in an copy-protected location of the media article.

18. The method of claim 10, further comprising selecting the at least a portion of REAVD that is of a relatively massive size.

19. The method of claim 10, further comprising selecting the at least a portion of REAVD that is of a size equal to the secondary content.

* * * * *